United States Patent
Woo

(12) 
(10) Patent No.: US 6,336,074 B1
(45) Date of Patent: Jan. 1, 2002

(54) SATELLITE NAVIGATION RECEIVER WITH MAP GRAPHICS AND HYPERTEXT DRIVEN BY A PDF DATABASE

(75) Inventor: Arthur N. Woo, Cupertino, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 08/440,246

(22) Filed: May 12, 1995

(51) Int. Cl.$^7$ ................................................ G06G 7/78
(52) U.S. Cl. ...................... 701/208; 701/211; 701/213; 340/988; 340/990; 340/995; 342/357.06; 342/357.12; 342/357.13
(58) Field of Search .................. 364/443, 444, 364/449, 440, 460, 436–439; 342/357, 451, 463, 352; 340/990, 995, 988; 395/600, 155, 156, 157, 133, 162, 161

(56) References Cited

U.S. PATENT DOCUMENTS

| | | | | |
|---|---|---|---|---|
| 4,924,233 A | * | 5/1990 | Bird | 364/443 |
| 5,319,560 A | * | 6/1994 | Adams et al. | 364/439 |
| 5,408,655 A | * | 4/1995 | Oren et al. | 395/600 |
| 5,422,814 A | * | 6/1995 | Sprague et al. | 364/444 |
| 5,485,161 A | * | 1/1996 | Vaughn | 342/357 |
| 5,502,446 A | * | 3/1996 | Denninger | 342/357 |
| 5,504,684 A | * | 4/1996 | Lau et al. | 364/443 |
| 5,517,605 A | * | 5/1996 | Wolf | 395/155 |
| 5,528,248 A | * | 6/1996 | Steiner et al. | 342/357 |

OTHER PUBLICATIONS

"Portable Document Format Reference Manual", Adobe Systems, Inc., 1993, Addison–Wesley Publishing Company, ISBN 0–21–62628–4.

* cited by examiner

Primary Examiner—Jacques H. Louis-Jacques
(74) Attorney, Agent, or Firm—Thomas E. Schatzel; Law Offices of Thomas E. Schatzel

(57) ABSTRACT

An improved GPS navigation receiver for converting range and range-rate information from microwave radio transmissions from orbiting satellites and for determining a position of the receiver from a processing of the information and an output connected to provide the determined position on a display. The improvement comprises a database of maps stored in a portable document format (PDF) file independent of any hardware, software and operating system used to create it. The PDF file provides for a description of documents including any combination of text, graphics and images in a device-independent and resolution-independent format. The database is connected to output selected ones of the maps on the display with hypertext access on points-of-interest.

2 Claims, 2 Drawing Sheets

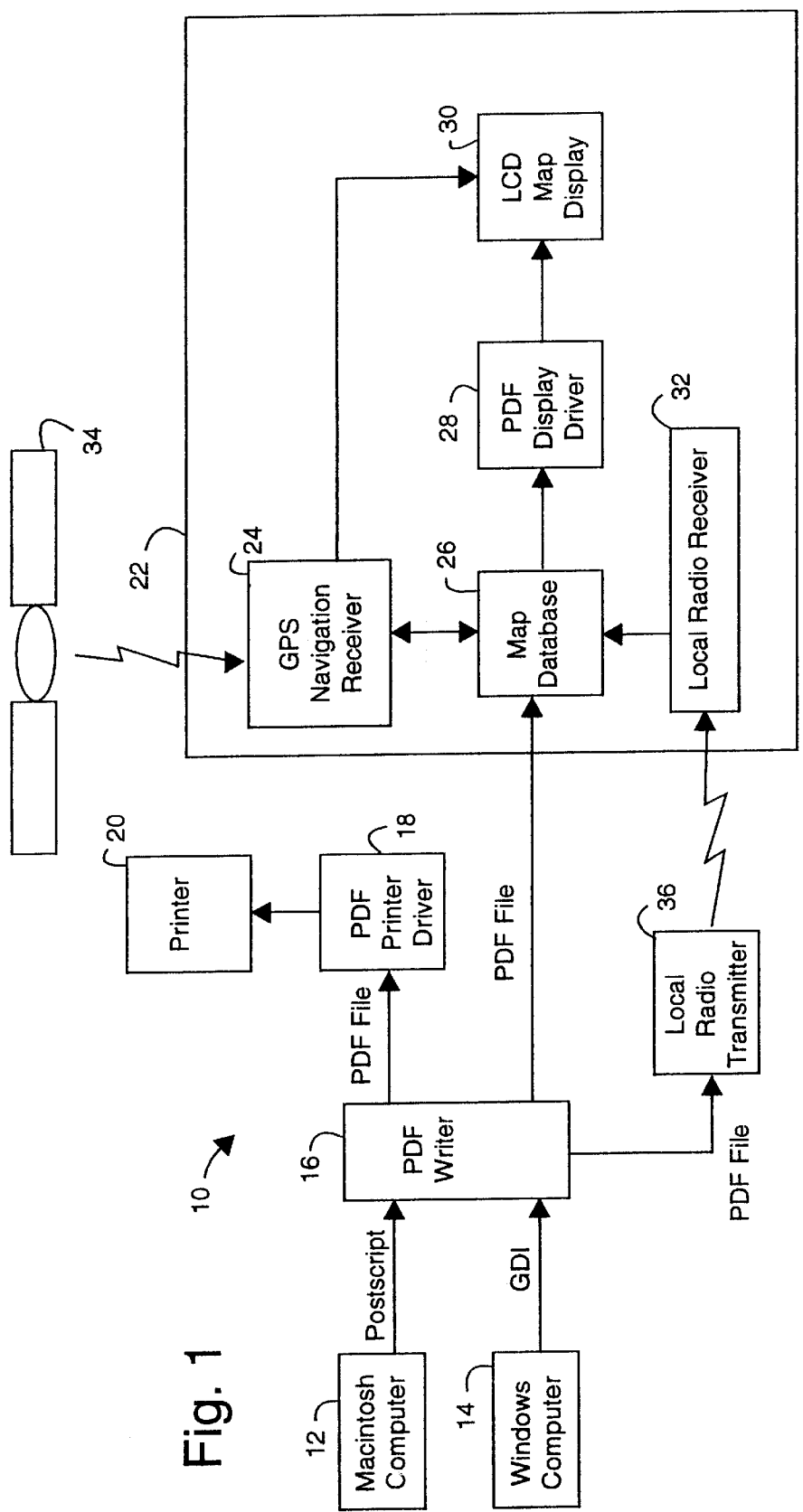

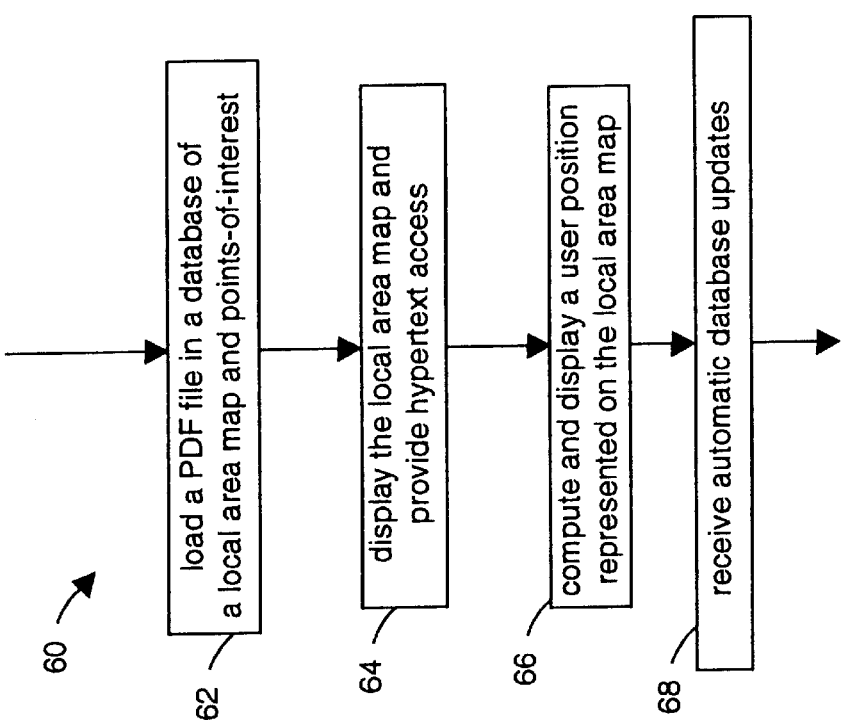
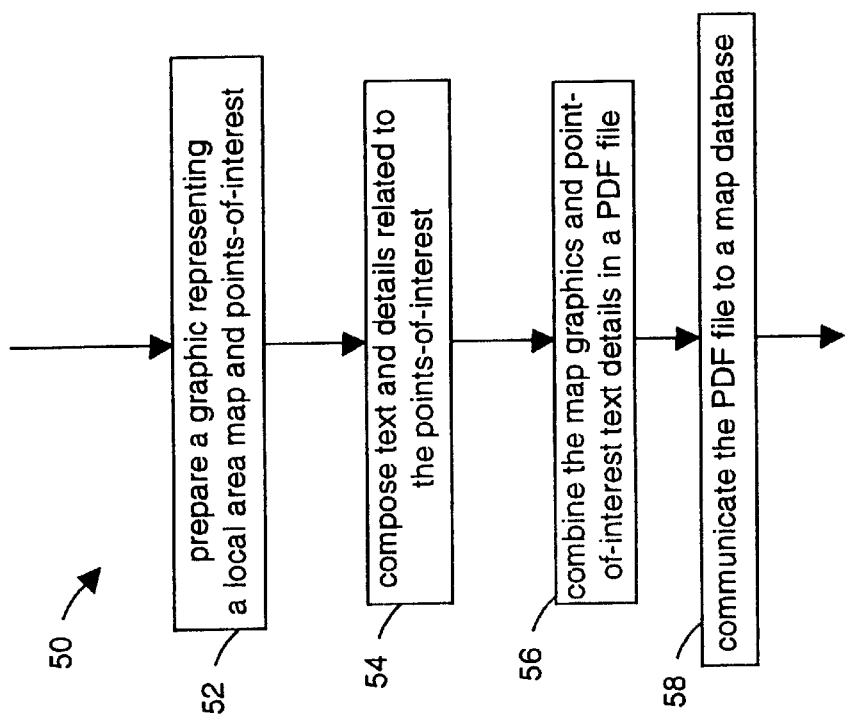

SATELLITE NAVIGATION RECEIVER WITH MAP GRAPHICS AND HYPERTEXT DRIVEN BY A PDF DATABASE

BACKGROUND OF THE INVENTION

1. Field of the Invention

The invention relates generally to navigation systems and more specifically to navigation receivers with graphic map displays and hypertext buttons driven from a portable document format (PDF) database.

2. Description of the Prior Art

Ships and aircraft have traditionally been important applications of navigation technology. Given the critical needs of such applications, ships and aircraft have tended to be fitted with the latest in navigation technology. Today that technology includes global position system (GPS) navigation receivers. Such GPS receivers can determine three-dimensional earth position and velocity by processing of microwave radio signals transmitted by dozens of orbiting GPS satellites. The accuracy of such determinations is amazing, special purpose GPS receivers can accurately gauge their own position to within a few inches.

The traditional means of communicating a navigation position has been in terms of latitude and longitude. Paper maps with grids marked in latitude and longitude are conventionally consulted to find one's position on the map. Recent commercial products marketed by Trimble Navigation (Sunnyvale, Calif.) have the ability to dispense with the use of latitude and longitude terminology, and can communicate the user's position with text on a screen display that provides, e.g., a Thomas Brothers map page number and the number of inches up and over from a corner of the map page that represents the user's current position. Support for the United States Geological Survey (USGS) 7.5 minute topographic series of maps is also provided by such GPS receivers.

The most recent batch of GPS receivers universally include modest liquid crystal displays (LCDS) that allow more than just text on lines to be communicated to a user. Such displays allow waypoints or target goals to be represented by the distance and direction to them from the currently computed location. Many models further include an arrow or needle and scale indication in graphic form on the screen that indicates the direction to proceed to the waypoint. Such displays side-step the problems that humans encounter when all that one has to go by are positions expressed only in terms of latitude and longitude. Some GPS receivers have a screen mode in which the relative positions of surrounding waypoints are displayed in plan view.

Tremendous advances in fabrication technology and cost reduction in GPS receivers have recently given rise to a new crop of handheld and portable GPS receivers that indicate a user's position directly on a map representation. For example, pleasure boaters are offered a cartographic GPS receiver by Magellan that uses an LCD to display a boaters position relative to the coastline and hazards. Such map displays actually contain far less detail than standard United States National Oceanic and Atmospheric Administration (US-NOAA) navigation charts, so such charts are still necessary to navigate coastal waters safely. Many such GPS receiver products use "C-map" cartridges that store regional map data in separately-available plug-in modules. The maps are represented by "bit-mapped" data that requires large amounts of storage space for even the simplest of graphics images and that loses resolution as one tries to zoom-in for a closer look of the surrounding neighborhood. Therefore, such cartridges are exchanged in the GPS receiver according to the user's area of interest. But even so, the detail available in such electronic maps is disappointing.

GPS receivers with color map display are being marketed with chart displays, e.g., the Garmin GPSMAP receiver. A built-in worldwide database provides a zoomed out view to the 64-mile level. Postage-stamp sized Garmin "G-charts" include a navionics database for showing detailed information such as depth contours, navigation aid characteristics and restricted area boundaries for individual locations. The screen views may be smoothly scrolled and panned without triggering complete screen redraws.

Even the best of conventional GPS receivers with chart displays lose map resolution and detail as one tries to zoom in. Such detail has traditionally been very costly in terms of storage memory requirements, and so such detail is missing. As the costs of GPS systems continues to decline, such map-based systems will find their way into the hands of progressively more amateur users. For example, the navigation of cars and trucks on the highways using GPS map displays is becoming popular, and a proliferation of products directed to such drivers is beginning to appear at prices ordinary people can afford.

Computer printers were, at one time, principally of the dot-matrix type. Seven or nine horizontal lines of dots were used to construct representations of characters. Hard copy from such printers was unmistakable because of the coarseness of the characters formed. Higher dot densities were ultimately used, but the cost of multiplying the amount of data and storage needed to represent each character is too great in terms of the memory needed. Dot densities as high as three hundred dots-per-inch (DPI) are so fine that the individual dots in a character are no longer apparent and distinctive character fonts can be constructed. These high dot densities also permit very acceptable graphics images to be constructed, stored, viewed on a display and printed. A typical monitor will reduce such "bit-mapped" graphics to resolutions of 1024-by-1024 dots to fit on a standard black and white screen. This results in a million bits being needed to represent the screen graphic, shades of gray and color can multiply this requirement many fold.

Laserprinters conventionally have dot resolutions of three hundred DPI. The communication of a whole printed page's worth of dots would ordinarily require many megabytes of information to be communicated and several minutes to process. Since much of that printed by laserprinters is text, a shorthand is used that communicates so-called "ASCII" eight-bit characters for each character to print, line-by-line. Graphics, however are commonly still bit-mapped.

Adobe Systems (Sunnyvale, Calif.) introduced the POSTSCRIPT page description language that allows Apple MACINTOSH computers to reduce the volumes of data and time needed to communicate printing information to a laserprinter. The graphics, such as a circle, are not communicated in terms of which dots in a raster matrix are white or black, but rather in terms of the center position of the circle, its radius and the line weight. A POSTSCRIPT processor in the printer then converts the circle's description to dot illuminations, for printing at the maximum resolution that the printer can produce. Such graphics can be manipulated in position, size and line weight, e.g., as is necessary to represent zooming into and out of a map display. The representation of graphics as art objects in this way has proven to be tremendously efficient, and does not suffer from a loss of line resolution as one zooms in for closer detail.

Portable document format (PDF) files, e.g., as defined in the commercial market by Adobe Systems, allow the use of computer files that are independent of the application software and operating system to create it. Therefore, PDF files can be readily converted to and from POSTSCRIPT and Apple Computer QUICK-DRAW file types that embed processing language. Each PDF file contains a PDF document and other supporting data. Each PDF document has one or more pages which may contain text, graphics and images in a device and resolution independent format. A PDF document may also contain purely electronic representations such as hypertext links. Each PDF file further contains the version of the PDF specification used in the file and information about the important structures in the file.

A commercial product called PDF WRITER is available to run on both the Apple MACINTOSH and computers running Microsoft WINDOWS (e.g., GDI) that acts as a printer driver for POSTSCRIPT and GDI application programs. A printer driver ordinarily converts operating system graphics and text commands into commands that will be understood by a particular attached printer. Such drivers embed commands into printer command streams for page printing. The PDF WRITER sends such command streams after embedding to a PDF file instead. The resulting PDF files are platform independent, e.g., they may be freely exchanged between MACINTOSH and WINDOWS computers. PDF files are seven-bit ASCII and may be accessed by PDF viewing applications on any platform, e.g., Adobe ACROBAT EXCHANGE running on the MACINTOSH.

Some conventional applications programs produce POSTSCRIPT page descriptions directly because of certain limitations in QUICKDRAW and GDI imaging models, or because they are running on DOS or UNIX computers that have no system-level printer driver. For these applications, POSTSCRIPT page descriptions can be converted to PDF files by commercial products from Adobe called ACROBAT DISTILLER and ACROBAT READER.

The imaging model of the POSTSCRIPT language is used by PDF to represent text and graphics. A PDF page description draws a page by placing "paint" on selected areas of a blank white page. Painted figures may be letter shapes, regions defined by combinations of lines and curves, or digitally-sampled images of photographs. Such paint can be any color or shade. Any figure can be clipped to another shape, such that only parts of the figure within the shape will appear in the page. PDF uses marking operators similar to POSTSCRIPT marking operators, but it is not a programming language, and so does not include procedures, variables and control constructs. As a result, applications can more efficiently and reliably locate text strings in PDF files, compared to POSTSCRIPT files.

PDF files support industry-standard compression filters like JPEG compression of color and grayscale images, CCITT Group-3 FAX, CCITT Group-4, Lempel-Ziv-Welch (LZW) and run length compression of monochrome images and LZW compression of text and graphics. Such compression is important to maximizing how much page information can be stored by any particular memory and the maximum communication rate needed for any particular connection.

SUMMARY OF THE PRESENT INVENTION

It is therefore an object of the present invention to provide a GPS receiver that stores maps for graphical display in a PDF database.

It is a further object of the present invention to provide a GPS receiver that allows hypertext access of information related to particular points of interest in a PDF map display.

It is a still further object of the present invention to provide a system for the automatic loading of a map database of a mobile GPS receiver with hypertexted-maps of the vicinity.

Briefly, an embodiment of the present invention comprises a GPS navigation receiver connected to a database of maps stored in a portable document format (PDF) file that are independent of any hardware, software and operating system used to create it and that provide for descriptions of documents including any combination of text, graphics and images in a device-independent and resolution-independent format. Hypertext access buttons are provided on an LCD map display for a user to call up data related to points-of-interest represented on a local area map. The GPS receiver indicates the computed position of the user on the map display.

An advantage of the present invention is that a navigation system is provided that offers high map resolution and detail from a database of only a few megabytes.

Another advantage of the present invention is that a mobile navigation system is provided that provides point-of-interest details through hypertext links.

A still further advantage of the present invention is a system and GPS receiver are provided for the automatic loading of a map database of a mobile GPS receiver with maps of the vicinity and hypertext access to local points-of-interest.

These and other objects and advantages of the present invention will no doubt become obvious to those of ordinary skill in the art after having read the following detailed description of the preferred embodiment which is illustrated in the drawing figures.

IN THE DRAWINGS

FIG. 1 is a block diagram of a navigation system embodiment of the present invention;

FIG. 2 is a flow chart of a first method embodiment of the present invention.

FIG. 3 is a flow chart of a second method embodiment of the present invention.

DETAILED DESCRIPTION OF THE PREFERRED EMBODIMENT

FIG. 1 illustrates a navigation system embodiment of the present invention, referred to by the general reference numeral 10. The system 10 comprises an Apple Computer MACINTOSH personal computer (PC) 12 for generating page description language (PDL), e.g., Adobe Systems POSTSCRIPT, files representing maps of local areas with hypertext data for local points of interest, and a PC 14 running the Microsoft WINDOWS operating system for generating the same maps using the graphics data interface (GDI) format PDL. A conversion program 16, e.g., Adobe Systems PDF WRITER, converts the POSTSCRIPT and GDI formatted map files to Adobe Systems PORTABLE DOCUMENT FORMAT (PDF) type files. A PDF printer driver 18 accepts such PDF files and translates the PDF files for a printer 20 that outputs hardcopy of the local area maps for conventional use. A mobile navigation system 22 includes a global positioning system (GPS) receiver 24, e.g., a Trimble Navigation SCOUT, a map database 26, a PDF display driver 28 and a liquid crystal map display 30. The maps are communicated from the PCs 12 and 14 to the map database 26 by direct programming of the memory of the database 26, the use of plug-in cartridges, or removable magnetic and optical disks.

Alternatively, the PDF files of the local area maps and their local points of interest in hypertext are received by radio carrier by a local radio receiver 32 from a local radio transmitter 36. For example, as the mobile navigation system 22 moves into a local area, neighborhood short-range transmitters 36 pass both maps and hypertext data of the same neighborhood to the map database 26 via the receiver 32. The local radio receiver 32 therefore automatically replaces the local map displayed on the LCD 30 with the correct one. The GPS receiver 24 indicates on the LCD 30 the computed position of the user on the current local map display. User buttons on the GPS receiver allow the user to select various points of interest represented at the most detailed zoom-in level of the map display and to see hypertext called up by clicking on a particular point of interest. Such hypertext may include restaurant menu fare, store hours, gas prices, telephone numbers and addresses that are up-to-the-minute accurate.

Many types of radio services can be used to provide the link between the transmitter 36 and the receiver 32. For example, telephone pagers routinely provide digital data to roaming mobile units in wide local vicinities. FM broadcast subcarriers are also an opportune medium. Differentially-corrected GPS receivers have beacon receivers that are tuned to VHF and UHF signals from local stations that could be further expanded to include transmissions of local area maps, e.g., correct up-to-the-minute navigation charts with navigation hazards detailed by hypertext access.

It is critical to the present invention that the maps stored in the database 26 be data formatted in a resolution-independent and a device-independent format, e.g., PDF as defined by Adobe Systems in their copyright 1993 document "Portable Document Format Reference Manual", ISBN 0-21-62628-4. The PDF file format, and formats of similar ilk that are sure to become commercially available in the future, allow maps to be stored in just a few megabytes of memory that have the detail and resolution that rival the hardcopy maps most car drivers are used to seeing. Such file types further provide hypertext access of point-of-interest data and content searching.

The map database 26 communicates to the GPS receiver data about the current maps stored in the database 26, e.g., in terms of their identity, scope, scale and reference points. Coordinates of hypertext links are given for selecting them via the LCD display 30. Hypertext accesses of data are communicated from the GPS receiver 24 to the map database 26.

Preferably, the mobile navigation system 22 is integrated as a single portable or handheld unit, wherein the LCD display 30 is merged with the conventional displays found on commercially-available units, e.g., the Trimble Navigation SCOUT.

In operation, hypertext buttons are positioned on the LCD map display 30 according to the relative geographic position on the local area map of the corresponding point-of-interest. Such a configuration allows a user to "point-and-click" at points-of-interest in familiar locations and adjacent to the user's indicated position. Where a point-of-interest name or coordinate location is unknown, a keyboard included in the GPS receiver 24 is used to accept text editor inputs that are then used to search the map and hypertext database 26. The database 26 returns the found point-of-interest name and map coordinate location. The corresponding hypertext button and/or the hypertext itself are displayed on the LCD map display 30.

FIG. 2 illustrates a method of the present invention, referred to herein by the general reference numeral 50, for creating the informational data for the database 26. In a step 52, a graphic representing a local area is constructed that includes points-of-interest by a computer. For example, a street map, topographic contour map or navigation chart. Source files used to create ordinary maps for public consumption as hardcopy may be used to advantage. A step 54 composes special text and details related to the points-of-interest in a hypertext file. For example, a point-of-interest on a navigation chart for San Francisco Bay is the South Beach Harbor at pier forty in San Francisco. Boaters in the area would need to know the harbor master's phone number, hours of operation, and a list of guest berths available. Given the availability of a radio link such as is shown between the transmitter 36 and receiver 32 in FIG. 1, it would be possible for an updated schedule of available guest berths to be communicated to visitors in the vicinity with the mobile navigation system 22. It would be particularly advantageous for new visitors to include hypertext details that include a graphic representing the layout of the marina, dock-by-dock, and the location of the guest dock and gas dock. The nature and currency of hypertext information is highly dependent on the application and the particular point-of-interest. In a step 56, the map graphics and hypertext information are encapsulated in the PDF file format, e.g., from a POST-SCRIPT or GDI source file. In a step 58, the PDF file is communicated out to the mobile navigation system 22, e.g., on a floppy disk, PCMCIA disk, wireless radio service, infrared, or even laser.

FIG. 3 illustrates a method of the present invention, referred to herein by the general reference numeral 60, for mobile navigation. In a step 62, a PDF file is stored in the database 26 accessible to the GPS navigation receiver 24, for example in a non-volatile semiconductor memory or magnetic disk. In a step 64, a local area map represented in the PDF file is output to the display 30 with hypertext access buttons connected to allow fetching of text and details of points-of-interest. A step 66 uses the GPS navigation receiver 24 to compute a position and to display that position relative to the local area map on the LCD display 30. In an alternative embodiment of the present invention, a step 68 automatically receives PDF files from local sources as the navigation system 22 moves into the respective area. Such automatically received PDF files are then loaded in the database 26 and presented on the LCD display 30 as local area maps.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for creating informational data for a map database in a mobile navigation system that includes a GPS navigation receiver, comprising the computer-implemented steps of:

constructing a graphic representing a local area map that includes a set of points-of-interest;

composing special text and details related to said points-of-interest in a hypertext file;

encapsulating said map graphics and hypertext information in a portable document format (PDF) file that is independent of any hardware, software and operating system used to create it and that provides for a description of documents including any combination of text, graphics and images in a device-independent and resolution-independent format connected to output selected ones of said maps on said display; and communicating said PDF file to a map database included in said mobile navigation system.

2. A navigation system comprising:

a navigation receiver for converting range and range-rate information from microwave radio transmissions from orbiting satellites and for determining a position of the receiver from a processing of said information and having an output connected to provide a determined-position dataflow;

a database including a device-and-resolution-independent portable document format (PDF) file of area maps represented by text and graphics data for selective display and having hyperlinks to structures represented in said area maps;

a screen connected to receive said determined-position dataflow from said output of the navigation receiver and said area maps from the database;

a portable document format (PDF) display driver connected to the screen and the database and provided for zooming into and out of selected ones of said area maps, selecting particular ones of said area maps and for accessing selected ones of said hyperlinks, wherein detailed information is provided to a user via a hypertext-file reference about said structures upon selection by clicking on a corresponding hypertext screen representation in a corresponding one of said area maps;

local radio reception means for receiving radio transmissions in a restricted local area of PDF files representing area maps that intersect said restricted local area and connected to the database for display of said intersecting area maps by the screen, wherein a user of said system is automatically-provided map and hyperlink information specific to said restricted local area;

local radio transmission means for sending radio transmissions in a restricted local area of PDF files representing area maps that intersect said restricted local area for automatically providing map and hyperlink information specific to said restricted local area to a system user;

a map display on said screen and including hypertext buttons positioned at locations representative of actual locations of corresponding points-of-interest;

the database further includes hypertext descriptions of said points-of-interest which are accessed by said hypertext buttons; and the database further includes text editor means for searching said PDF file including said hypertext according to at least one of a street address and a name of said points-of-interest, wherein a corresponding hypertext button is indicated when a search finds a match.

* * * * *